(12) United States Patent
Shinozaki

(10) Patent No.: US 7,666,936 B2
(45) Date of Patent: Feb. 23, 2010

(54) COATING FILM FORMING METHOD, COATING MATERIAL, RELEASING AGENT AND RUBBER MATERIAL

(75) Inventor: Massanori Shinozaki, Chofu (JP)

(73) Assignee: Juki Corporation, Chofu-shi, Tokyo (JP)

( * ) Notice: Subject to any disclaimer, the term of this patent is extended or adjusted under 35 U.S.C. 154(b) by 621 days.

(21) Appl. No.: 11/408,498

(22) Filed: Apr. 21, 2006

(65) Prior Publication Data

US 2006/0258813 A1  Nov. 16, 2006

(30) Foreign Application Priority Data

Apr. 22, 2005  (JP) .......................... P.2005-124979

(51) Int. Cl.
*C08L 3/18* (2006.01)

(52) U.S. Cl. ........................ 524/430; 524/433; 524/547

(58) Field of Classification Search ................. 524/430, 524/433, 547

See application file for complete search history.

(56) References Cited

U.S. PATENT DOCUMENTS

| 6,074,698 | A | * | 6/2000 | Sakurai et al. | ............... | 427/307 |
| 6,410,641 | B2 | * | 6/2002 | Sato et al. | .................... | 524/588 |
| 6,569,977 | B1 | * | 5/2003 | Liu | ............................. | 526/335 |

FOREIGN PATENT DOCUMENTS

| JP | 4-74165 | 11/1992 |
| JP | 8-20029 | 1/1996 |

* cited by examiner

*Primary Examiner*—Bernard Lipman
(74) *Attorney, Agent, or Firm*—Merchant & Gould P.C.

(57) ABSTRACT

A coating film is formed on a surface of rubber by applying a coating material containing a solvent which swells a rubber and a resin on the surface of the rubber material.

2 Claims, 2 Drawing Sheets

Fig.1A
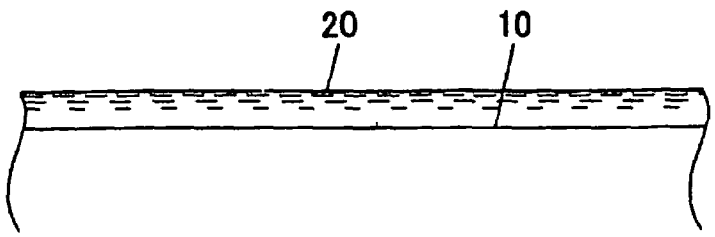
Fig.1B
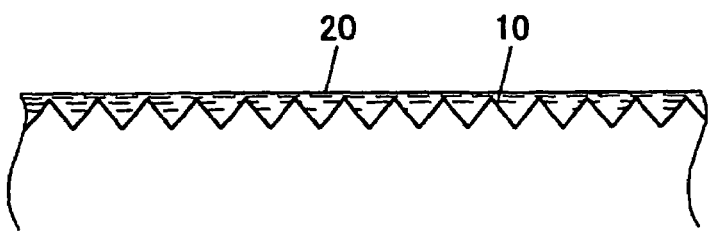
Fig.1C
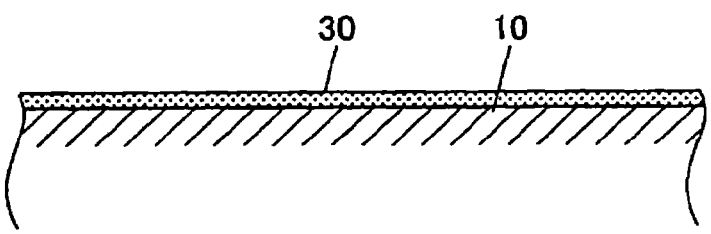
Fig.2
| Solvent | Swelling rate % | Weight before dipping | Weight after dipping |
|---|---|---|---|
| Cyclohexanone | +4.3 | 2.772 | 2.891 |
| Cellosolve acelate | +0.67 | 2.675 | 2.693 |
| DIBK | +10.1 | 2.625 | 2.891 |
| Butyl Cellosolve | +0.8 | 1.426 | 1.438 |
| Acetone | +1 | 1.675 | 1.692 |
| Xylene | +64 | 1.244 | 2.044 |

COATING FILM FORMING METHOD, COATING MATERIAL, RELEASING AGENT AND RUBBER MATERIAL

The present invention claims foreign priority to Japanese patent application no. 2005-124979, filed on Apr. 22, 2005, the content of which is incorporated herein by reference.

BACKGROUND OF THE INVENTION

1. Field of the Invention

The present invention relates to a coating film forming method, a coating material, releasing agent and a rubber material.

2. Description of the Related Art

As a method for mold-vulcanizing rubber in a production process of a tire or the like, it is ordinarily conducted that a bladder in a rubber-made bag shape is inserted inside raw material rubber before being mold-vulcanized and, then, while the raw material rubber is pressed against a metal mold by supplying a gas of high temperature and high pressure such as steam inside the bladder, such mold-vulcanization of the rubber is performed with heating and pressure.

In order to prevent the bladder from sticking to the raw material rubber to be mold-vulcanized, an art of previously forming a film of, for example, a releasing agent containing a silicone rubber, transition element metal powder and a solvent containing a halogenated hydrocarbon oil on a surface of the bladder to be used in a step of mold-vulcanizing the rubber is known (for example, see Japanese Patent Unexamined Publication JP-A-8-20029).

By forming a coating film compounded with the transition element metal power, the above-described related art firstly efficiently captures sulfur or a sulfur compound which causes to accelerate deterioration of a silicone film on the bladder, and suppresses deterioration of the coating film of the releasing agent, to thereby enhance durability of the coating film.

However, since the related art adopts a method in which the coating film is formed in a state of covering a surface of the rubber which constitutes the bladder, sufficient durability against various problems to be generated with expansion and contraction of the bladder, such as a peeling-off or a scratch as an external factor, can not be exhibited.

SUMMARY OF THE INVENTION

An object of the present invention is to enhance durability of a coating film.

According to a first aspect of the invention, a coating film forming method for a rubber material includes step of applying a coating material containing a resin and a solvent which swells a rubber on a surface of the rubber material.

According to a second aspect of the invention, as set forth in the first aspect of the invention, the resin provides the surface of the rubber with a releasing property.

According to a third aspect of the invention, as set forth in the first aspect of the invention, the coating film forming method for a rubber material further includes step of mixing a filler to the coating material in order to provide the surface of the rubber with a sliding property.

According to a fourth aspect of the invention, a coating film forming method for forming a coating film on a surface of a rubber material includes step of dipping the rubber material in a coating material containing a resin and a solvent which swells a rubber.

According to a fifth aspect of the invention, as set forth in the fourth aspect of the invention, the resin provides the surface of the rubber with a releasing property.

According to a sixth aspect of the invention, as set forth in the fourth aspect of the invention, the coating film forming method for a rubber material further includes step of mixing a filler to the coating material in order to provide the surface of the rubber with a sliding property.

According to a seventh aspect of the present invention, a coating material includes a solvent which swells a rubber, and a resin which provides a surface of a rubber with a releasing property.

According to an eighth aspect of the invention, as set forth in the seventh aspect of the invention, the coating material further includes a filler which provides the surface of the rubber with a sliding property.

According to a ninth aspect of the invention, a releasing agent includes a solvent which swells a rubber, and a resin which provides a surface of a rubber with a releasing property.

According to a tenth aspect of the invention, as set forth in the ninth aspect of the invention, the releasing agent further includes a filler which provides the surface of the rubber with a sliding property.

According to an eleventh aspect of the invention, a rubber material includes a coating film formed by applying a coating material containing a resin and a solvent which swells a rubber on a surface of the rubber material or dipping the rubber material in the coating material containing the resin and the solvent which swells a rubber, wherein the resin is penetrated into inside of the rubber material from a surface thereof.

According to a twelfth aspect of the invention, as set forth in the eleventh aspect of the invention, a filler is penetrated into inside of the rubber material from a surface thereof.

In each of the above-described aspects of the present invention, since the surface of the rubber is swelled by using the solvent, a component of the solvent penetrates into among molecules and, along with this component of the solvent, a resin is allowed to penetrate into inside the rubber from the surface thereof. Therefore, compared with a case in which the resin is merely attached on the surface of the rubber, high durability against deformation, expansion and contraction, or sliding of the surface of the rubber is exerted and, then, the coating film is hardly peeled off. For this reason, the durability of the coating film can be enhanced and frequency of forming the coating film against repeated use of the rubber can be reduced and, therefore, it becomes possible to realize a high efficiency of processing.

Further, when the resin has a releasing property, it is possible to form a coating film having the releasing property on the surface of the rubber material.

Still further, when a filler having a sliding property on a surface thereof is added, the sliding property on the surface of the rubber material is improved and, therefore, it is possible to enhance the durability of the coating film against sliding by such addition of the filler.

BRIEF DESCRIPTION OF THE DRAWINGS

FIG. 1A is an explanatory view illustrating a coating step of a coating material in a method for forming a coating film on a surface of rubber as an embodiment according to the present invention;

FIG. 1B is an explanatory view illustrating a swelling step in a method for forming a coating film on a surface of rubber as an embodiment according to the present invention;

FIG. 1C is an explanatory view illustrating a drying step in a method for forming a coating film on a surface of rubber as an embodiment according to the present invention;

FIG. 2 is a table showing weight change rates of butyl rubber when the rubber is dipped in each of various types of solvents for 3.5 hours.

DESCRIPTION OF THE EXEMPLARY EMBODIMENTS

Figure 3:
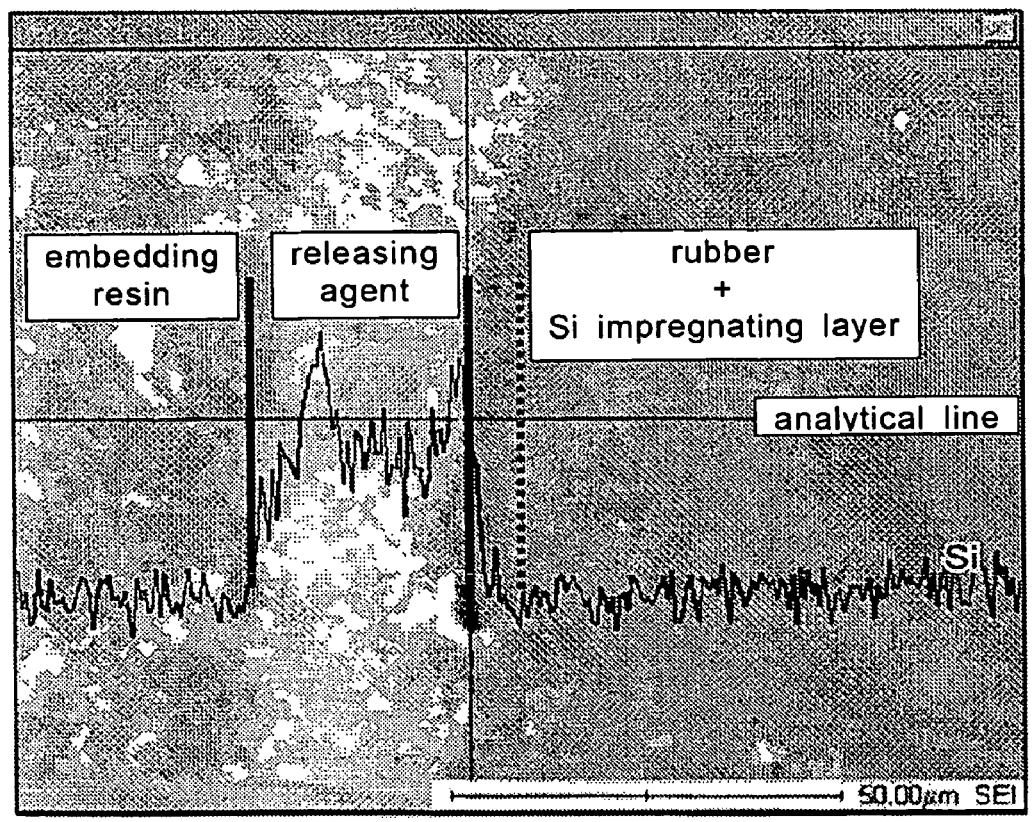
FIG. 3 is an explanatory diagram showing in a superimposing manner a cross-sectional view of a vicinity of a surface of butyl rubber when a coating material is applied on the surface of the rubber to form a coating film by the steps illustrated in FIGS. 1A to 1C and a diagram of densities of silicone resin to be contained determined from a linear analysis of a characteristic X-ray of Si to be emitted by an electron irradiation at respective positions in a depth direction from the surface of the rubber.

Embodiments according to the present invention will be described with reference to the drawings.

The present embodiment will be described taking a case in which a coating film forming treatment is performed on a rubber material that forms a bladder to be used in vulcanize-molding a tire as an example.

The bladder is formed in a bag shape and, at the time of vulcanize-molding a tire, is filled inside the tire made of unvulcanized rubber held in a metal mold and, then, the bladder is blown by filling an inside of the bladder with saturated steam, hot water or the like having high temperature and high pressure and pressed against an inside face of the metal mold, to thereby perform the vulcanize-molding. As for the rubber material forming the bladder, butyl rubber is used.

Then, since the bladder is pressed against the tire under high temperature and high pressure, it is necessary to form a coating film having a releasing action on a surface of the bladder at a side facing the tire for preventing the tire and the surface of the bladder from press-bonding to each other after the vulcanize-molding treatment.

The coating film forming treatment to be used on such occasion as described above is described with reference to FIGS. 1A, 1B and 1C. FIGS. 1A, 1B and 1C are each an explanatory view illustrating a coating film forming method against a surface of the rubber according to the present embodiment.

Firstly, as shown in FIG. 1A, a coating material 20 for forming a coating film is applied on a face of a bladder 10 which comes in press-contact with the tire. Although such application is preferably performed at room temperature (about 20° C.), it is not limited to the specified temperature.

The coating material 20 is a releasing agent in which a solvent having an action to swell a surface of rubber (the bladder 10), a resin which allows the surface of the rubber (the bladder 10) to have a releasing property, and a filler which allows the surface of the rubber (the bladder 10) to have a sliding property are mixed with one another.

A method for applying the coating material on the surface of the bladder 10 is not particularly limited and, for example, after the surface of the bladder 10 is subjected to brushing, the coating material 20 is applied on the surface of the bladder by a brushing method, a spray method or the like. In another case, the bladder 10 may directly be dipped in the coating material 20 filled in a container.

FIG. 2 is a table showing weight change rates (swelling rates) of butyl rubber when the rubber is dipped in each of various types of solvents for 3.5 hours. In the present coating film forming treatment, it is desirable to use the rubber having a higher swelling rate. According to FIG. 2, when xylene was used as a solvent, a highest swelling rate was obtained. Then, in the coating material 20, xylene was adopted as a solvent to be mixed. Further, it is permissible to use DIBK (diisobutyl ketone) or cyclohexanone which shows a highest swelling rate next to xylene in place of xylene.

As for resins each having the releasing property to be contained in the coating material 20, acrylic silicone resin can be mentioned.

As for other materials each having the releasing property to be contained in the coating material 20, a water-base or solvent-base releasing agent, for example, an aqueous diorganopolysiloxane emulsion in which an inorganic silicate that has been allowed to be hydrophobic by a reaction with an organic silicide is dispersed, a powder releasing agent composition containing a copolymer of dialkylpolysiloxane and polyalkylene glycol and mica or talc, a lubricant composition, containing an aminoalkyl group-modified organopolysiloxane and a surfactant, which can self cross-links by a carbon dioxide gas, a silicone composition containing organopolysiloxane, methyl hydrogen polysiloxane, silica and a metallic organic acid salt, and the like can be mentioned.

As for other materials having the releasing property, a releasing agent represented by the general formula [1] described below, having a composition containing polysiloxane (referred to as component A) having a complex coefficient of viscosity of from 1×103 to 1×107 centipose at 25° C., organosiloxane (referred to as component B) having an aminoalkyl group, and organosiloxane (referred to as component C) having an epoxy group, in which a total of contents of the component A, the component B, and the component C is from 1% to 90% by weight and weight ratios of the component A, the component B, and the component C are from 10% to 90% by weight/from 0.5% to 40% by weight/from 1% to 50% by weight can be mentioned.

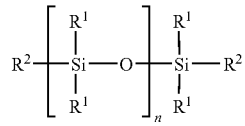

[1]

Organosiloxane having an aminoalkyl group to be used as the component B is not particularly limited and, for example, a hydrolytic condensate of dialkoxysilane having n amino group such as a hydrolytic condensate of γ-aminopropyl methyl dimethoxysilane or γ-(N-β-aminoethyl)aminopropyl methyl dimethoxysilane, a cohydrolytic condensate of dialkoxysilane having an amino group and dialkoxysilane without having any amino group such as a cohydrolytic condensate of γ-(N-β-aminoethyl)aminopropyl methyl dimethoxysilane and dimethyl dimethoxysilane can be mentioned.

Organosiloxane having an epoxy group to be used as the component C is not particularly limited and, for example, a hydrolytic condensate of dialkoxysilane having an epoxy group such as a hydrolytic condensate of γ-glycidyloxypropyl methyl dimethoxysilane, a cohydrolytic condensate of dialkoxysilane having an epoxy group and dialkoxysilane without having any epoxy group such as a cohydrolytic condensate of γ-glycidyloxypropyl methyl dimethoxysilane and dimethyl dimethoxysilane can be mentioned.

In the above-described composition, a catalyst such as an organic zinc compound, an organic titanium compound, or an organic tin compound can optionally be added. As for such catalysts, for example, zinc laurate, zinc acetate, zinc stearate, tin octylate, zinc octylate, tetrapropyl titanate and a partial hydrolysate thereof, bisdipropoxytitanium, bis(acetyl acetonate) titanium oxide, titanium lactate, ammonium titanium lactate, dibutyl tin dilaurate, dibutyl tin dioctate, dioctyl tin dilaurate, and dioctyl tin diacetate can be mentioned.

In the above-described composition, inorganic powder or organic powder can be compounded. As for inorganic powder to be used, for example, mica, kaoline, talc, calcium carbonate, magnesium carbonate, zinc carbonate, graphite, carbon black, carbon fluoride powder, titanium oxide, and boron nitride can be mentioned. As for organic powder to be used, for example, fluorocarbon resin powder such as TEFLON® powder, fine particle silicone resin powder, nylon powder, polystyrene powder, a paraffin wax, a fatty acid amide, a fatty acid soap, and a fatty acid amine salt can be mentioned. These organic and inorganic powder may be used either each individually or in combination of two types or more.

As for fillers, RBC (Rice Bran Ceramic) can be mentioned. Besides RBC, other substances which each exhibit a sliding property or abrasion resistance on the surface of the rubber, for example, talc, graphite, carbon fibers, silica, silicon nitride, boron nitride, calcium carbonate, mica, and aluminum silicate can be added to the coating material as fillers.

When the above-described coating material 20 is applied on the surface of the rubber material constituting the bladder 10, as shown in FIG. 1B, the surface of the rubber is swelled by an action of xylene, to thereby allow xylene as a solvent to penetrate among rubber molecules. Along with such penetration of xylene among the rubber molecules, an acrylic silicone resin as a releasing agent penetrates into inside of the rubber from the surface thereof. Further, RBC which is a filler also penetrates into inside of the rubber from the surface thereof.

In FIG. 1B, although the surface of the rubber in serriform is illustrated, this is only for the purpose of conceptually showing easiness of such penetration of the solvent or silicone resin and actual form thereof is not particularly limited.

Next, the surface of the bladder 10 is allowed to be dried. Namely, at room temperature (about 20° C.), the solvent is dried for about 30 minutes, to thereby cure the coating material 20. At this occasion, xylene contained in the coating material 20 is dried and the acrylic silicone resin and the RBC not only stick to the surface of the rubber but also remain in the vicinity of the surface of the rubber such that they penetrate into inside the vicinity of the surface of the rubber.

As for the solvents to be added to the coating material 20, those having higher volatility are preferred.

According to such steps as described above, as shown in FIG. 1C, a coating film 30 can be formed on the surface of the rubber which constitutes the bladder 10.

Since the coating film 30 contains the acrylic silicone resin having the releasing action and the RBC having the sliding property and abrasion resistance, it is possible to easily separate the surface of the bladder 10 from the tire in the vulcanize-molding of the tire.

Further, since the acrylic silicone resin and the RBC which are main components of the coating film 30 not only stick to the surface of the rubber but also are present such that they penetrate into inside the vicinity of the surface of the rubber, the coating film 30 exerts high durability against deformation, expansion and contraction of the bladder, sliding of the surface thereof and the like and is hardly peeled off. Therefore, only by performing a one-time forming treatment of the coating film 30, the bladder 10 can repeatedly be used in vulcanize-molding the tire.

Still further, since the RBC is added to the coating film 30, a slipping property of the surface thereof is improved and, then, it is possible to enhance durability of the coating film against sliding thereby.

REFERENCE EXAMPLE

FIG. 3 is an explanatory diagram showing in a superimposing manner a cross-sectional photograph of a vicinity of a surface of butyl rubber when a same coating material as that described above is applied on the surface of the rubber to form a coating film by same steps as those shown in FIGS. 1A, 1B and 1C, and a diagram (denoted as Si) of densities of a silicone resin to be contained determined from a linear analysis of a characteristic X-ray of Si to be emitted by an electron irradiation at respective positions in a depth direction from the surface of the rubber of the photograph. In the diagram, an axis of ordinate shows densities of the silicone resin to be contained while an axis of abscissas shows a depth direction of the rubber. Further, in the photograph, the surface of the rubber is directed in a nearly vertical direction. The photograph is taken in a state in which an embedding resin for pressing the bladder is pressed against the surface of the rubber.

As shown in FIG. 3, a high density of the silicone resin to be contained is shown at the surface side of the rubber (left hand side from an interface of the rubber as shown) in the range of about 20 µm in thickness. Namely, a layer of the silicone resin is formed in the range of about 20 µm in thickness.

Further, inside the surface (right hand side from the interface of the rubber as shown), an inclination in which the density thereof to be contained is gradually reduced in the range of about 10 µn in thickness is illustrated. Namely, it is found that the silicone resin penetrates in the range of about 10 µm in depth from the surface of the rubber.

REFERENCE EXAMPLE

By using a bladder (denoted as sample 1), containing butyl rubber, in which a coating material without containing a component which swells the rubber is applied on a surface and a coating film having a thickness of about 20 µm is formed thereon and another bladder (denoted as sample 2), containing butyl rubber, in which the above-described coating material 20 is used and the coating film 30 having a thickness of about 20 µm is formed on the surface thereof in a same step as described above, vulcanization was performed by applying pressure with a pressure of 20 kgf/cm$^2$ (1.96×106 Pa) against the material rubber of an unvulcanized tire with heating at 170° C. for 10 minutes.

As a result, with reference to the sample 1, although the releasing property was exhibited at a first test, the releasing property was not maintained even at a second test; whereas, with reference to the sample 2, the releasing property was able to be maintained until 70th test.

According to the present embodiment, a coating film formation targeted for the bladder to be used in the vulcanize-molding the tire is illustrated. However, such target for the coating film formation is not limited to the bladder and any of rubber molds which require the releasing action may be applied.

Further, according to the present embodiment, butyl rubber which is ordinarily used in the bladder is targeted for the coating film formation. However, such target for the coating film formation is not limited to butyl rubber and all types of rubber capable of being swelled may be targeted. The coating film may be formed against, for example, natural rubber, styrene-butadiene rubber, butadiene rubber, ethylenepropylene rubber, chloroprene rubber, chlorosulfonated polyethylene, nitrile rubber, urethane rubber, polysulfide rubber, acrylic rubber, epichlorohydrin rubber, silicone rubber, fluorocarbon rubber, or hydroxyl nitrile rubber.

Further, according to the above-described embodiment, the acrylic silicone resin is adopted as the resin. However, other resins may be adopted.

Still further, the coating material having the releasing property is illustrated. However, the application of the coating material is not limited thereto. Namely, also in the coating film formation by using the coating material in accordance with characteristics of the resin to be contained in the coating material, it goes without saying that the above-described technique to use a swelling solvent may be adopted. In that occasion, it is a matter of course that the target for the coating film formation is not limited to the bladder and may be to all rubber products which are each suitable as a base material for the coating material.

While there has been described in connection with the exemplary embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A coating material comprising:
   a solvent which swells a rubber; and
   a resin which provides a surface of the rubber with a releasing property, wherein Rice Bran Ceramic which provides the surface of the rubber with a sliding property is mixed with the solvent and the resin.

2. A releasing agent comprising:
   a solvent which swells a rubber; and
   a resin which provides a surface of the rubber with a releasing property, wherein Rice Bran Ceramic which provides the surface of the rubber with a sliding property is mixed with the solvent and the resin.

* * * * *